United States Patent [19]

Ikeuchi et al.

[11] Patent Number: 4,885,123

[45] Date of Patent: Dec. 5, 1989

[54] APPARATUS FOR HANDLING CONSTITUENT ELEMENTS OF REACTOR CORE

[75] Inventors: Hisaaki Ikeuchi; Manabu Madokoro; Haruo Sato; Takashi Jodoi, all of Hitachi, Japan

[73] Assignee: Hitachi, Ltd., Tokyo, Japan

[21] Appl. No.: 152,989

[22] Filed: Feb. 8, 1988

[30] Foreign Application Priority Data

Feb. 13, 1987 [JP] Japan .................. 62-29504

[51] Int. Cl.⁴ ............... G21C 7/00; G21C 19/00
[52] U.S. Cl. .................... 376/233; 376/234; 376/262; 294/906; 294/86.25; 294/86.3; 294/95
[58] Field of Search ............. 376/233, 262, 234; 294/2, 3, 906, 86.25, 86.29, 86.3, 95, 115

[56] References Cited

U.S. PATENT DOCUMENTS

| | | | |
|---|---|---|---|
| 952,095 | 3/1910 | Bole .................................. | 294/115 |
| 3,280,002 | 10/1966 | Huffer . | |
| 3,383,286 | 5/1968 | Paget . | |
| 3,768,668 | 10/1973 | Schukei ............................ | 376/262 |
| 3,856,621 | 11/1974 | Suvanto et al. .................. | 376/262 |
| 3,945,514 | 3/1976 | Dose ................................ | 376/262 |
| 3,994,775 | 11/1976 | Spurrier ........................... | 376/262 |
| 4,511,531 | 4/1985 | Swidwa et al. .................. | 376/262 |
| 4,663,114 | 5/1987 | Cransac et al. .................. | 294/906 |
| 4,713,210 | 12/1987 | Germer ............................ | 376/233 |

FOREIGN PATENT DOCUMENTS 2189816 1/1974 France .
0137293 10/1981 Japan .
0674967 7/1979 U.S.S.R. ........................... 294/95
1207569 10/1970 United Kingdom .
1402788 8/1975 United Kingdom .

Primary Examiner—Harvey E. Behrend
Attorney, Agent, or Firm—Antonelli, Terry & Wands

[57] ABSTRACT

The present invention provides an apparatus for handling core constituent elements of a reactor that comprises a core having as core constituent elements control rod assemblies each containing a control rod and fuel assemblies each containing nuclear fuel, a small rotating plug rotatably provided on the core, and a control rod drive mechanism provided on the small rotating plug, the control rod drive mechanism being characterized by comprising a plurality of grippers each having a hook projecting inwards so as to be able to engage with a handling head of the control rod and a hook projecting outwards so as to be able to engage with a handling head of each of the core constituent elements as a distance in the longitudinal direction; an operational head for opening and closing the grippers; and a third elevating drive mechanism for vertically driving the operational head; a second elevating frame for supporting the third elevating drive mechanism and the grippers; a second elevating drive mechanism for vertically driving the second elevating frame; a first elevating frame for supporting the second elevating drive mechanism and the second elevating frame; a first elevating drive mechanism for vertically driving the first elevating frame; and a frame which supports the first elevating drive mechansim and is provided on the small rotating plug.

5 Claims, 13 Drawing Sheets

FIG. IC
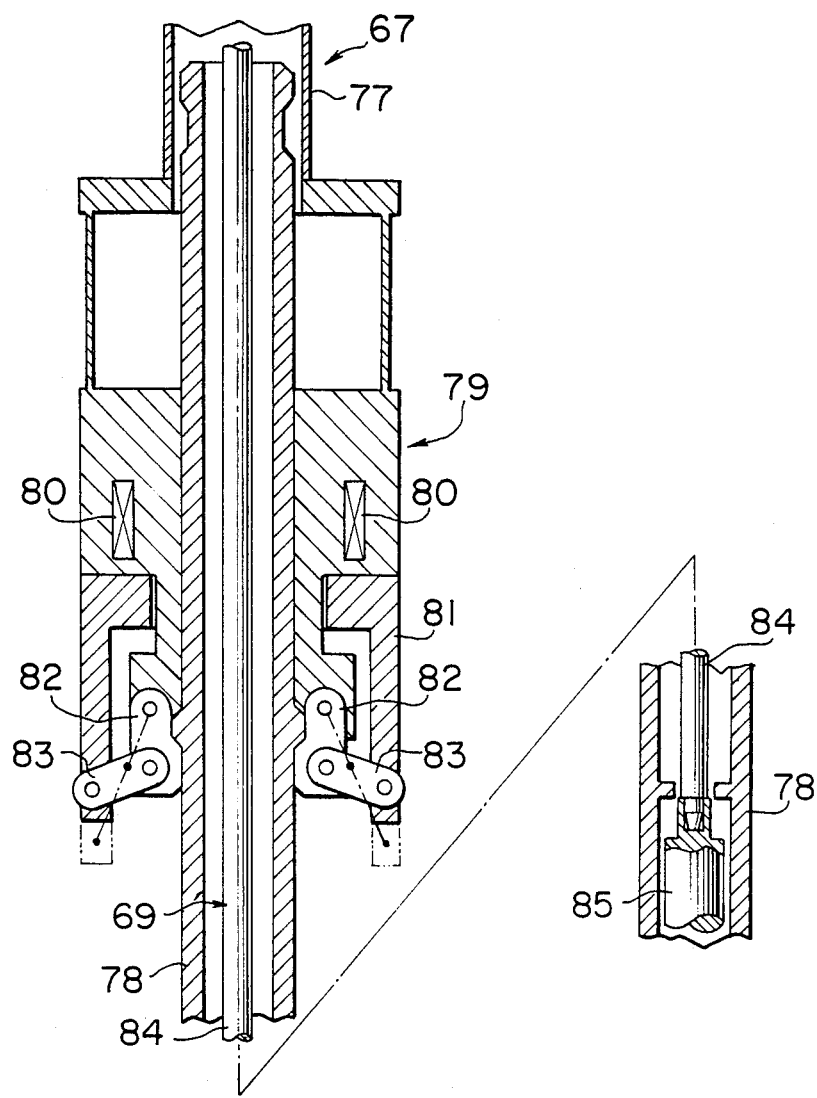

FIG. 8
FIG. 9
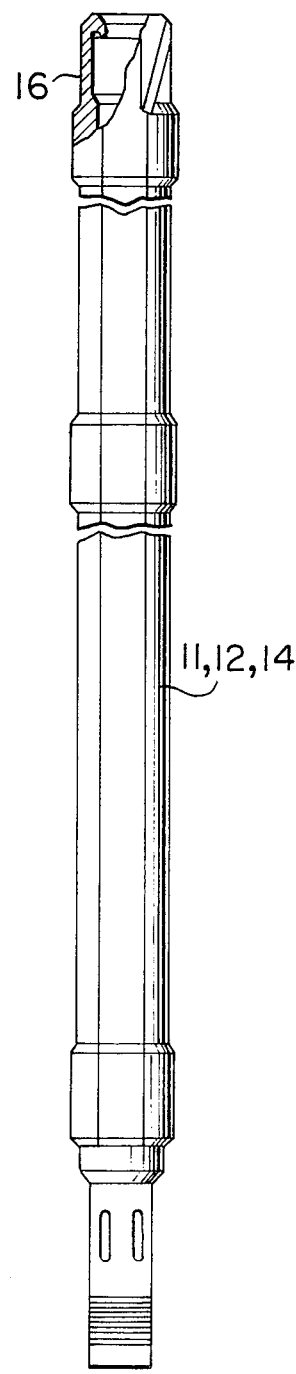
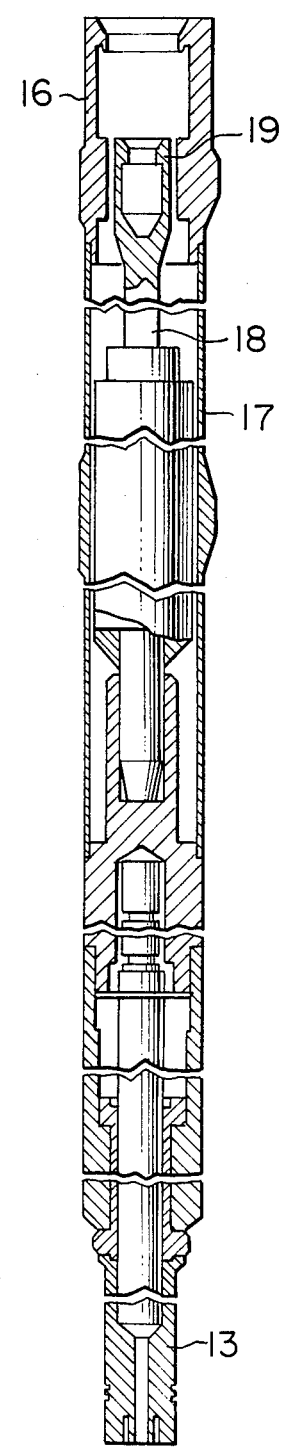

APPARATUS FOR HANDLING CONSTITUENT ELEMENTS OF REACTOR CORE

BACKGROUND OF THE INVENTION

The present invention relates to an apparatus for handling constituent elements of a reactor core, and particularly to a technique of handling fuel assemblies, control rod assemblies, and control rods of the core by utilizing a common apparatus.

FIG. 6 shows a conventional example of the reactor structure of a fast breeder reactor. The structure shown in FIG. 3 which was reported in "SUPERPHENIX NEWS" issued on March, 1987 is similar to the structure of a fast breeder reactor shown in FIG. 6. As shown in FIG. 6, the fast breeder reactor has a reactor vessel 1 and a roof deck 2 which covers the upper portion of the reactor vessel 1. The roof deck 2 comprises a large rotating plug 3 and a small rotating plug 4 which can rotate independently of each other. The vessel which is covered in this manner contains a core 5, a primary coolant sodium 6 which removes the heat generated by the nuclear reaction of the core 5, a circulating pump 7 for forcibly circulating the primary coolant so as to pass it through the core 5, and an intermediate heat exchanger 8 for performing heat exchange between the primary coolant whose temperature is increased by being passed through the core and a low temperature secondary coolant which is supplied from the outside of the vessel.

The large rotating plug 3 is disposed so that it can rotate relative to the roof deck 2, and the small rotating plug 4 is disposed so that it can rotate relative to the large rotating plug 3. A core upper mechanism 9 and a fuel exchanger 10 are provided in the small rotating plug 4. In addition, as shown in FIG. 7, the core 5 comprises as core constituent elements core fuel assemblies 11, blanket fuel assemblies 12, control rod assemblies 13, moving neutron shields 14, and fixed neutron shields 15. The side of the core 5 is provided with a transit pot for receiving the core constituent elements for a while before they are taken off to the outside of the reactor, so that the core constituent elements are carried out of the furnace from the transit pot in a fuel bucket by means of a fuel handling machine (not shown). An example of such a fuel handling machine is discussed in NUCLEAR TECHNOLOGY, Vol 68 (Feb. 1985) pp. 160-170.

Of the core constituent elements, the core fuel assemblies 11, the blanket fuel assemblies 12, the control rod assemblies 13, and the moving neutron shields 14 are required to be exchanged with new elements outside of the furnace or reactor, while the fixed neutron shields 15 need not be taken out of the furnace during the lifetime of a plant and are remained disposed in the furnace, as suggested by the name. Of the fuel assemblies which are brought into and removed from the furnace, the core fuel assemblies 11, the blanket fuel assemblies 12, and the moving neutron shields 14 all have the structure shown in FIG. 8 which comprise a handling head 16 at the upper end thereof for engaging with the claws of a gripper of the fuel exchanger, thereby allowing the assembly to be handled by the fuel exchanger. As shown in FIG. 9, each of the control rod assemblies 13 comprises a guide tube 17 and a control rod 18, in which a handling head 19 of the control rod 18 is gripped by the claws of a gripper of a control rod drive mechanism when the output of the core is to be controlled, so that each control rod can be moved longitudinally. In addition, when the control rod assemblies 13 are brought into or removed from the furnace or reactor, each of the assemblies 13 can be handled by gripping the upper end of the guide tube 17 by means of the claws of the gripper of the fuel exchanger.

FIG. 10 shows a fuel exchanger. As shown in the drawing, the fuel exchanger 10 has a fuel exchanger body 20 which is supported by chains 24 operated by a winch 23 so that the body can be moved upward and downward, and a guide sleeve 21. The fuel exchanger body 20 is provided for the purpose of gripping each of the core constituent elements, and the guide sleeve 21 is provided on the body 20 for the purpose of preventing swinging of the gripper during an earthquake. The fuel exchanger body 20 is driven upward and downward through the chains 24 and comprises claws for gripping the core constituent elements, a claw-operating shaft 26 for closing and opening the claws 25, and a claw driving apparatus 27 for driving upward and downward the claw-operating shaft 26 with an external cylinder which prevents the transverse vibration of the claw-operating shaft 26. As shown in FIG. 11, the claw-operating shaft 26 is pulled by the claw-driving apparatus 27 in order to grip the core constituent elements, and the fuel exchanger body 20 is moved downward to a position right above a given core constituent element in a state wherein the lower ends of the claws 25 are closed so that the claws 25 can be inserted into the handling head 16 of that core constituent element. As shown in FIG. 12, the claw-operating shaft 26 is moved downward by the claw-driving apparatus 27 so that the lower ends of the claws 25 are opened and engaged with the handling head 16 of the core constituent element. In this state, the fuel exchanger body 20 is moved upward by an elevating drive mechanism 23 so that the core constituent element can be taken out of the core. When a new fuel is charged into the core, the above-described operation may be performed in the reverse order. An analogue of this fuel exchanger is described in Japanese Patent Laid-Open No. 137293/1981.

FIG. 13 shows a control rod drive mechanism 28 which can be roughly divided into a drive mechanism part 29 and an upper guide tube part 30. The upper guide tube part 30 is supported on the upper surface of the small rotating plug 4 and is provided in the furnace including the primary coolant sodium 6 and argon atmosphere, the lower end being connected to a control rod 18 through the gripper 31. The drive mechanism 29 is accommodated in in a core upper mechanism 32 placed above the small rotating plug 4 and adjacent to the uppermost portion of the upper guide tube part 30. The gripper 31 is closed and opened by operating an operational shaft 10 in a similar manner to that in the fuel exchanger.

Although, as described above, an apparatus for handling the core constituent elements comprises the fuel exchanger and the control rod drive mechanism, the diameter of the small rotating plug is large and the diameter of the large rotating plug is hence large too, because the fuel exchanger as well as the core upper mechanism containing the control rod drive mechanism are provided on the small rotating plug in the above-described reactor. In addition, the diameters of the small and large rotating plugs are determined to be large in value so that the fuel exchanger can gain access to all the core constituent elements to be handled upon rotation of the two rotating plugs. Therefore, there has been a limit in reductions in the diameter of the large rotating plug in the prior art when attempts have been made to reduce the size of the structure of the fast breeder reactor and to reduce the construction cost thereof.

SUMMARY OF THE INVENTION

It is an object of the present invention to provide a reactor in which the diameter of a rotating plug can be reduced and which thus allows the size of a reactor vessel to be reduced.

In order to achieve the above object, the present invention can provide an apparatus for handling core constituent elements of a reactor that comprises a core having as core constituent elements control rod assemblies each containing a control rod and fuel assemblies each containing nuclear fuel, a small rotating plug rotatably provided on the core, and a control rod drive mechanism provided on the small rotating plug, the control rod drive mechanism being characterized by a plurality of grippers each having a hook projecting inwards so that it can engage with a handling head of the control rod and a hook projecting outwards so that it can engage with a handling head of each of the core constituent elements at a distance in the longitudinal direction; an operational head for opening and closing the grippers; a third elevating drive mechanism for vertically driving the operational head; a second elevating frame for supporting the third elevating drive mechanism and the grippers; a second elevating drive mechanism for vertically driving the second elevating frame; a first elevating frame for supporting the second elevating drive mechanism and the second elevating frame; a first elevating drive mechanism for vertically driving the first elevating frame; and a frame which supports the first elevating drive mechanism and is provided on the small rotating plug.

BRIEF DESCRIPTION OF THE DRAWINGS

FIG. 1c is a longitudinally sectioned view of an example of a magnetic link mechanism of the apparatus shown in FIGS. 1a and 1b of the first embodiment of the present invention;

FIG. 8 is a partially sectioned elevation view of the fuel assembly shown in FIG. 6;

FIG. 9 is a longitudinally sectioned view of the control rod assembly shown in FIG. 6;

DESCRIPTION OF THE PREFERRED EMBODIMENTS

Figure 1A:
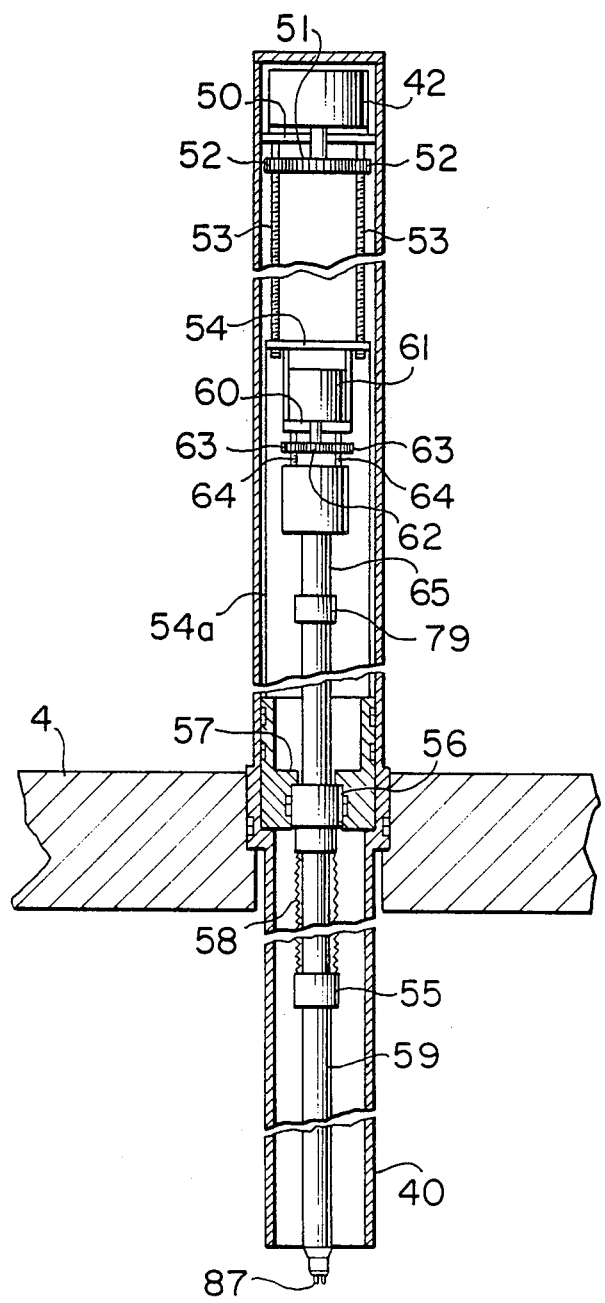
FIG. 1a is a longitudinally sectioned view of an apparatus for handling core constituent elements of a first embodiment of the present invention.
Figure 1B:
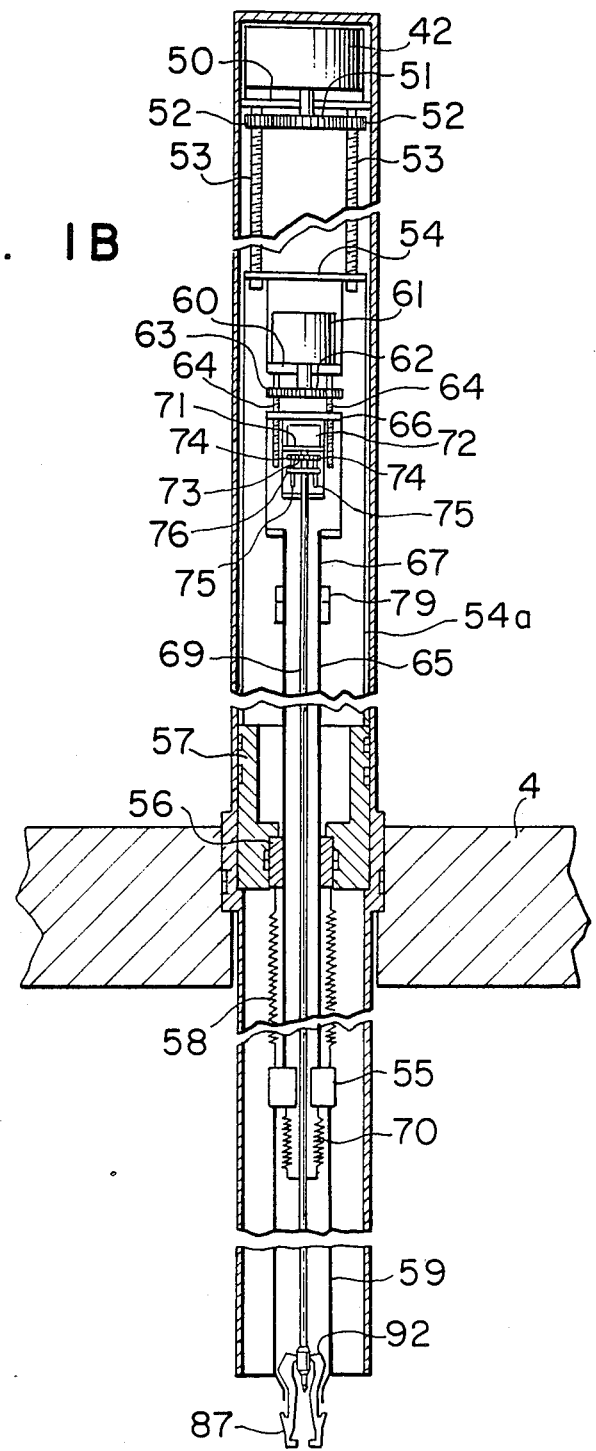
FIG. 1b is a longitudinally sectioned view of the internal structure of the apparatus for handling the core constituent elements of the first embodiment of the present invention.

A first embodiment of the present invention is shown in FIGS. 1a, 1b, 1c, 2 and 3.

The first embodiment is described below.

The apparatus for handling the core constituent elements of the present invention is provided on a small rotating plug 4 at the position where a conventional control rod drive mechanism is provided, in place of the conventional control rod drive mechanism. The same number of apparatuses for handling the core constituent elements as that of the conventional control rod drive mechanism are provided at the same positions.

The apparatus for handling the core constituent elements has the arrangement described below. A cylindrical frame 40 is vertically provided in the small rotating plug 4 of a fast breeder reactor, and a first elevating drive mechanism is provided in an upper portion of the frame.

The first elevating drive mechanism comprises a horizontal frame 50 which is fixed to the cylindrical frame 40 at an upper position of the frame and is provided with a first motor 42, a gear 51 which is provided on the rotary drive shaft of the first motor 42, and gears 52 which each engage with the gear 51 and which are each provided on a screw shaft 53 that is rotatably supported by the frame 50. A lower screw portion of each of the screw shafts 53 is screwed into a first elevating frame 54 which is connected to a sleeve 57 by a side frame 54a.

The first elevating frame 54 supports a second elevating drive mechanism that comprises a frame 60 which is provided on the first elevating frame 54 and has a second motor 61, a gear 62 which is provided on the rotating drive shaft of the second motor 61, and other gears 63 which each engage with the gear 62 and which are each provided on a screw shaft 64 which has an upper portion rotatably supported by the frame 60 and a lower screw portion screwed into a second elevating frame 65.

The second elevating frame 65 comprises a top frame 66, a cylindrical side frame 67 which is connected to the top frame 66, a frame 55 which is provided at the lower end of the side frame, bellows 70 which connect the frame 55 to an operational shaft 69, a gripper support frame 59 which has an upper end fixed to the frame 55, and bellows 58 which are connected to the frame 55 and one sleeve 56 of the sleeves 56, 57. The second elevating frame 65 supports a third elevating drive mechanism which comprises a frame 71 which is provided on a top plate 66 and has a third motor 72, a gear 73 which is provided on the rotary drive shaft of the third motor 72, and other gears which each engage with the gear 73 and which are each provided on a screw shaft 75 which has an upper portion rotatably supported by a frame 71 and a lower screw portion screwed into an operational shaft support frame 76.

The upper end of the operational shaft 69 is fixed to the operational shaft support frame 76.

The side frame 67 is, as shown in FIG. 1c, divided into an upper frame 77 and a lower frame 78 which are connected to each other by a magnetic link mechanism 79. This magnetic link mechanism 79 comprises an electromagnet 80 supported by the frame 77, a cylindrical body frame 81 attracted by the electromagnet 80, and links 82, 83 connecting the body frame 81 to the magnet side. Each of the links 82 engages with a projection of the frame 78. The operational shaft 69 comprises an upper operational shaft 84 and a lower operational shaft 85 which are connected to each other by the lower end of the upper shaft being tightly inserted into the upper end of the lower shaft at an intermediate position of the operational shaft 69.

Figure 2:
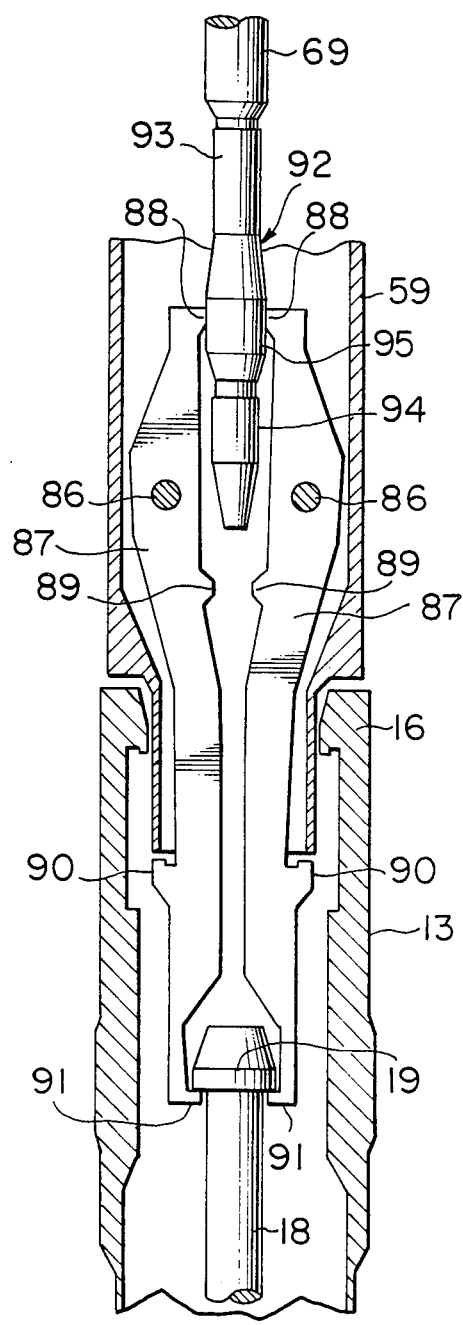
FIG. 2 is a longitudinally sectioned view of grippers of the apparatus for handling the core constituent elements of the first embodiment of the present invention in a state wherein the grippers grip a handling head of a control rod.

As shown in FIG. 2, the gripper support frame 59 has a lower end of an external diameter that can be inserted into a handling head 16 of each of control rod assemblies 13, and fuel assemblies 11, 12, but the upper portion thereof has a large external diameter which cannot be inserted into the handling head 16.

Figure 3:
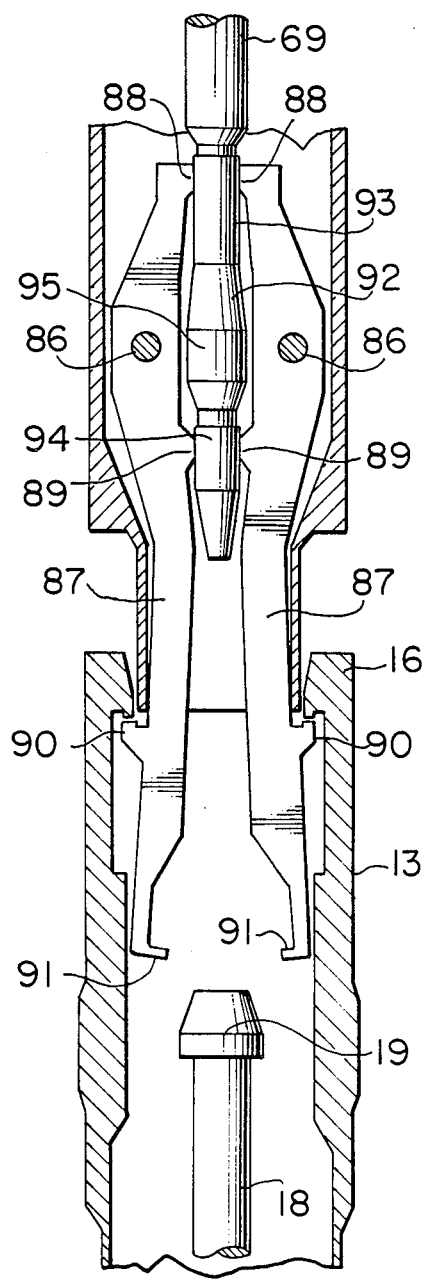
FIG. 3 is a longitudinally sectioned view of the grippers of the apparatus for handling the core constituent elements of the first embodiment of the present invention in a state wherein the grippers grip a handling head of a control rod assembly.

As shown in FIG. 2, three grippers 87 are provided on shafts 86 at equal angular intervals within the gripper support frame 59, and are rotatable around the shafts 86 so that the state shown in FIG. 2 can be changed to the state shown in FIG. 3 or vice versa.

Each of the grippers 87 has a shape in which projections 88, 89 projecting inwards are provided in the upper end and an intermediate portion of the gripper 87, respectively, an upper hook 90 projects outwards, and a lower hook 91 projects inwards. Since the hooks 90, 91 are separated from each other in the longitudinal direction but are not much separated from each other in the lateral direction, the grippers 87 can be inserted into the narrow handling head 16 even when the hooks 90, 91 are projecting outward and inward, respectively.

A handling head 19 provided at the upper end of a control rod 18 contained in each of the control rod assemblies 13 has a shape having a projection which projects outward in the lateral direction and so can be supported by the lower hooks 91. The handling head 16 of each of the control rod assemblies 13 and the fuel assemblies 11, 12 has a shape having a projection which projects inward in the lateral direction and so can be supported by the upper hooks 90.

The lower end of the operational shaft 69 is provided with an operational head 92 which comprises an upper portion 93, a lower portion 94, and an intermediate portion 95 having a greater diameter than those of the upper and lower portions.

A description will now be made of the operation of the first embodiment as configured above.

When the first motor 42 is driven, the torque of the motor 42 is transmitted to each of the gears so as to rotate the screw shafts. When the screw shafts are rotated, the first elevating frame 54 and the structural portions below the frame 54 can be moved either upward or downward.

In a state wherein the first elevating frame 54 has been moved downward, the lower end of the gripper support frame 59 is inserted in the handling head 16.

When the third motor 76 is then driven, each of the gears 73, 74 is rotated so as to rotate the screw shafts 75. When the frame 71 is moved downward by the rotation of the screw shafts 75, the operational shaft 69 moves downward, with the bellows 70 extending so that the intermediate portion 95 of the operational head 92 abuts against the projections 88. Consequently, each of the grippers 87 rotates around its shaft 86 so as to close the lower ends of the grippers 87. When the grippers 87 are closed, the handling head 19 of the control rod 18 is supported by the hooks 90 of the grippers 87 so as to be gripped thereby.

When the second motor 61 is then driven so as to rotate each of the gears 62, 63, the screw shafts 64 are rotated so that the second elevating frame 65 is moved either upward or downward. In the state wherein the handling head 19 of the control rod 18 is gripped by the grippers 87, the longitudinal movement of the second elevating frame 65 causes the control rod 18 to move the same amount as the longitudinal movement in the same direction. When the control rod 18 is moved downward so as to be deeply inserted in the core of the reactor, the output of the reactor is decreased; while, when the control rod is shallowly inserted into the core, the output is correspondingly increased.

In this way, the output of the reactor is controlled.

If the output of the reactor increases abnormally, the temperature of the coolant of the reactor rises above the normal temperature. In this case, the function of the electromagnet 80 of the magnet link mechanism 79 is shut off so that the body frame 81 is moved downward, as shown by the dot-dot-dash lines in FIG. 1c, and the links 82, 83 which were placed at certain angles are aligned along an oblique line. As a result, the engagement between the link 82 and the frame 78 is removed so that the frame 78 is moved downward until it hits the upper end of the lower operational shaft 85. The impact force produced by this collision causes the lower operational shaft 85 to be separated from the upper operational shaft 84 and moved downward together with the frame 78. Consequently, the control rod 18 is also moved downward and is more deeply inserted into the core of the reactor at high speed, regardless of the motors. The output of the reactor is therefore decreased so that a safe state of the reactor is obtained.

The control rod assemblies 13 and the fuel assemblies 11, 12, which are the core constituent elements, are handled in the manner described below.

The first elevating frame 54 is moved downward by driving the first motor 42 so that the lower end of the gripper support frame 59 is inserted shallowly into each control rod assembly, as shown in FIG. 3. Then the operational shaft 69 is moved downward by driving the third motor 72 so that the upper portion 93 and the lower portion 94 of the operational head 92 are brought into contact with the projections 88 and 89 of the grippers, respectively, and the lower ends of the grippers are opened, as shown in FIG. 3. When the grippers are opened, the hooks 90 and the handling head 16 are engaged with each other. When the first elevating frame 54 is then moved upward by driving the first motor 42, the second elevating frame 65, the operational shaft 69, and the gripper support frame 50 are also moved upward by the same amount at the same time. Thus the grippers 87 are moved upward while they are still open, and the hooks 90 engage with the handling head 16 so that each of the control rod assemblies 13 and the various fuel assemblies 11, 12 can be pulled up out of the core of the reactor.

Subsequently, each of the pulled-up control rod assemblies 13 and the fuel assemblies 11, 12 is placed above a pocket provided in the periphery of the core by horizontally rotating the large rotating plug and the small rotating plug 4, and is then made to fall into the pocket by driving the first motor in the reverse direction. The operational shaft is then moved upward by driving the third motor 72 so that the grippers are closed. The gripper support frame 59 is moved upward by driving the first motor 42 or the second motor 61 while the grippers are closed so that the grippers 87 are separated from the handling head 16.

Each of new control rod assemblies 13 and various fuel assemblies 11, 12 placed in the pocket can be gripped by the grippers 87 and transferred into the core by an operation which is the reverse of that of the transfer from the reactor core to the pocket.

Therefore, in accordance with the first embodiment, it is possible to control the output of the reactor by controlling the position in the core at which each control rod 18 is inserted, and to cause the emergency shutdown of the output of the reactor by inserting the control rods deeply into the core by adding the weight of the structure above each control rod 18 thereto, regardless of the motors which are separated by the magnetic link mechanism 79 in which the function of the magnet might be shut off in an emergency, facilitating the work of exchanging the core constituent elements.

Since the control rods and the fuel assemblies, which are core constituent elements, can be handled and exchanged in the space where a conventional control rod drive mechanism is provided, the space required for a conventional fuel exchanger can be removed so that the diameter of the small rotating plug 4 and the diameter of the large rotating plug surrounding the small rotating plug 4 can be greatly reduced. Therefore, the size of the reactor vessel can be reduced and the amount of materials used in the reactor structure can also be reduced, so that the reactor structure can be made more economical.

Figure 4:
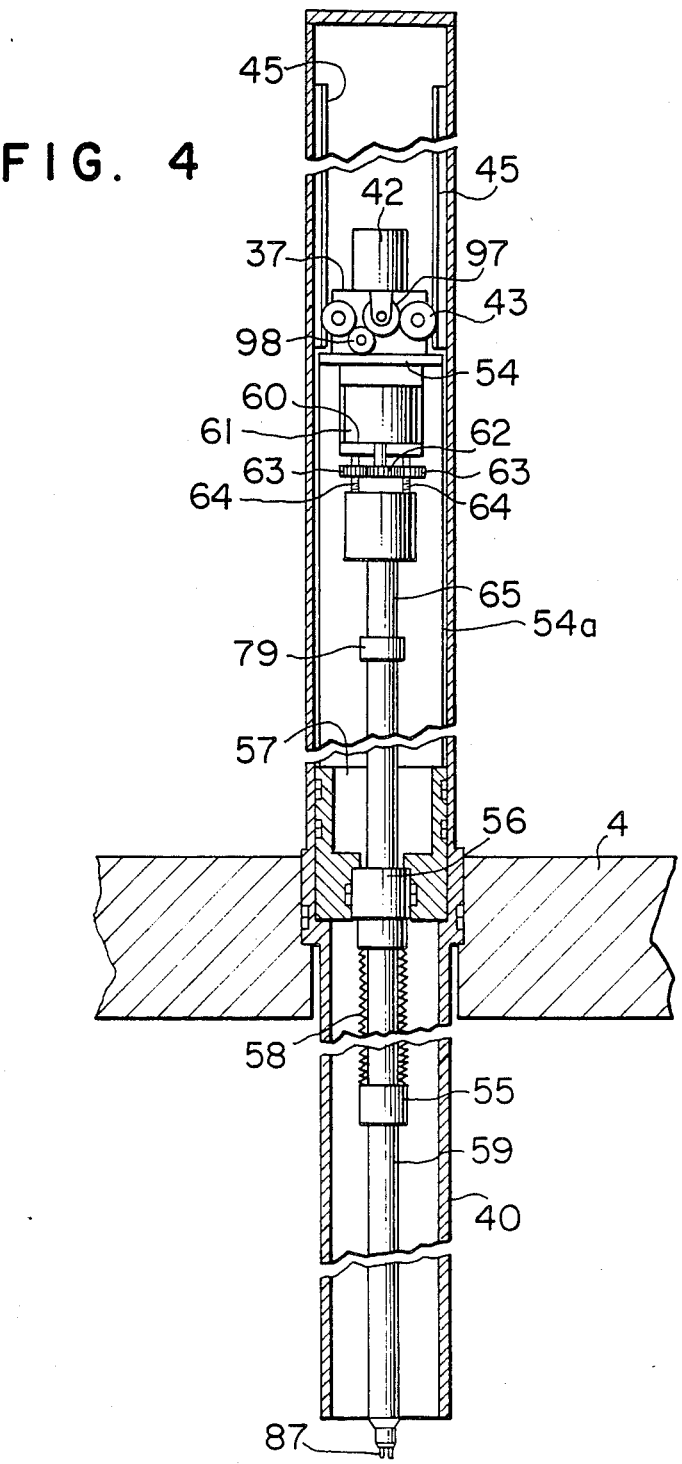
FIG. 4 is a longitudinally sectioned view of the apparatus for handling the core constituent elements of a second embodiment of the present invention.

FIG. 4 shows a second embodiment of the present invention.

Since in the second embodiment only the first elevating drive mechanism is changed from the first embodiment, only the changed part is described below.

Racks 45 are vertically fixed to an upper wall of the frame 40, and pinions 43 which each engage with the racks 45 are rotatably provided on a frame 37. The first motor 42 is provided on the frame 37 which supports the first elevating frame 54, and one of the pinions 43 directly engages with a drive gear 97 which is rotated by the first motor 42 and is engaged with the other pinions 43 through an idle gear 98.

In this structure, since each of the pinions 43 is rotated by driving the first motor 42 while the pinions 43 are engaged with the corresponding racks 45, the first frame 54 can be moved upward. Since the other parts are the same as those of the first embodiment, the second embodiment can achieve the same functional effect as the first embodiment.

Figure 5:
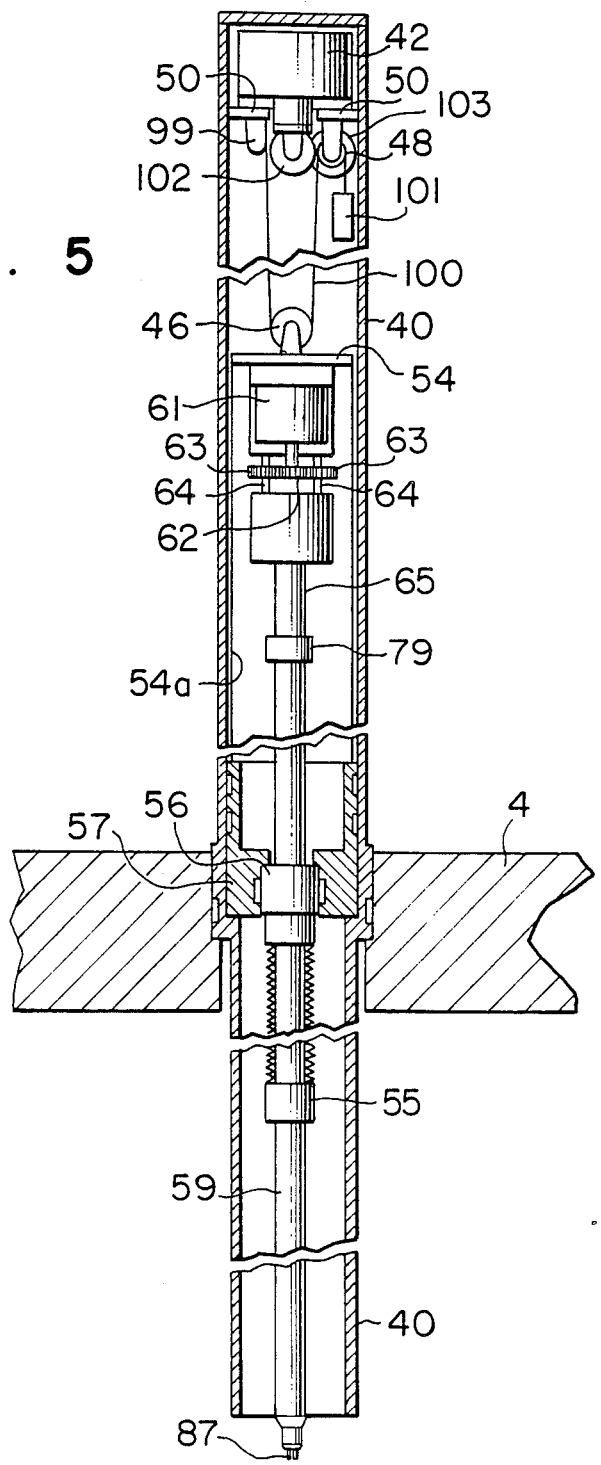
FIG. 5 is a longitudinally sectioned view of the apparatus for handling the core constituent elements of a third embodiment of the present invention.
Figure 6:
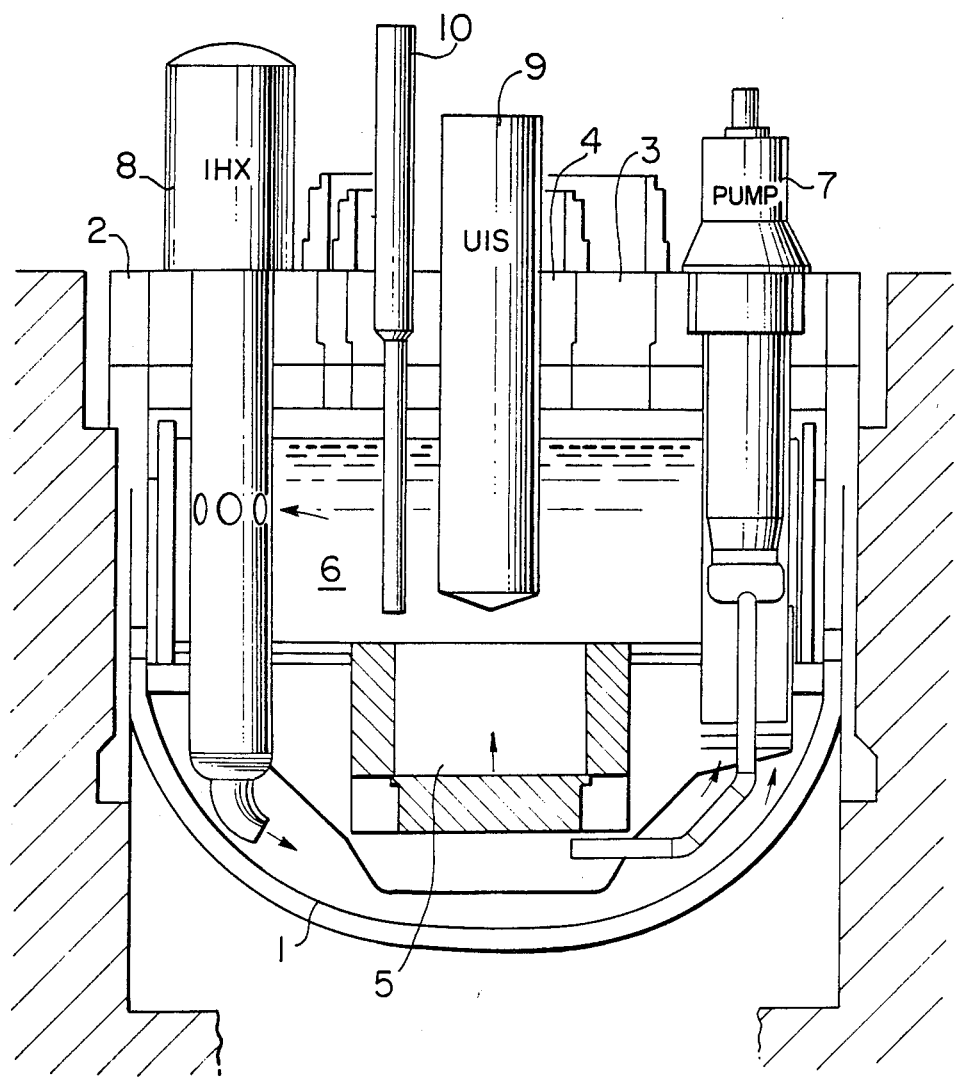
FIG. 6 is a longitudinally sectioned view of the structure of a conventional fast breeder reactor.
Figure 7:
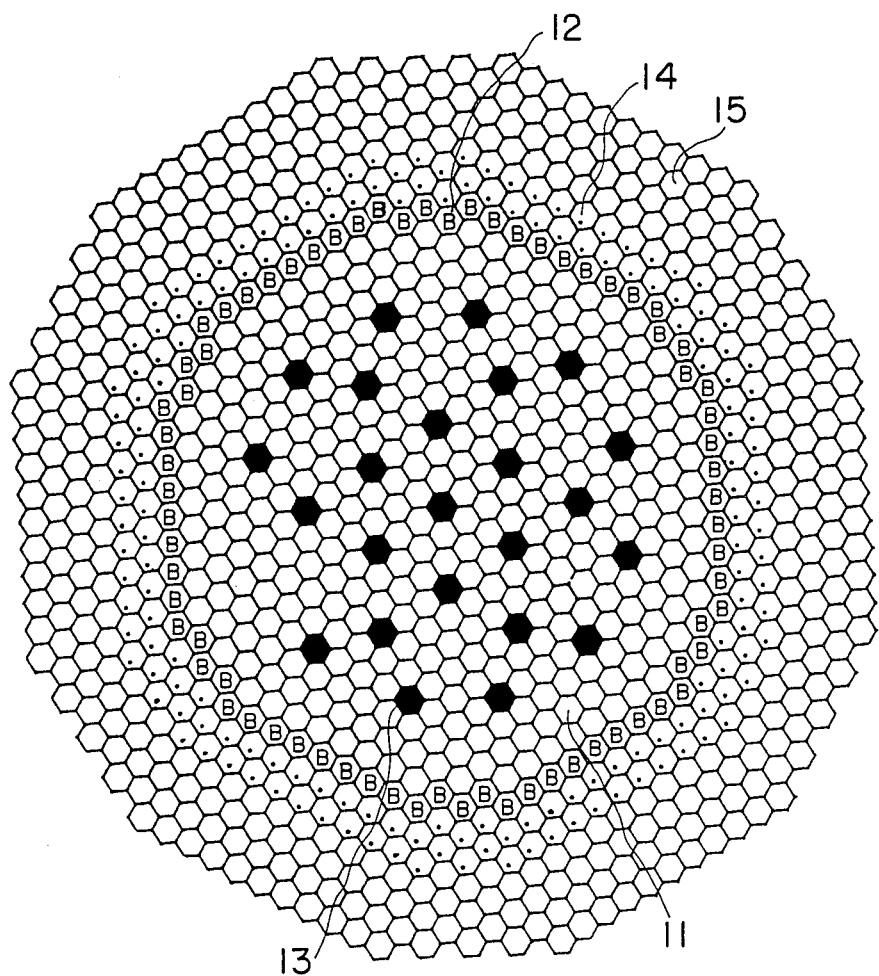
FIG. 7 is a plan view of the arrangement of core constituent elements of the core shown in FIG. 6.
Figure 10:
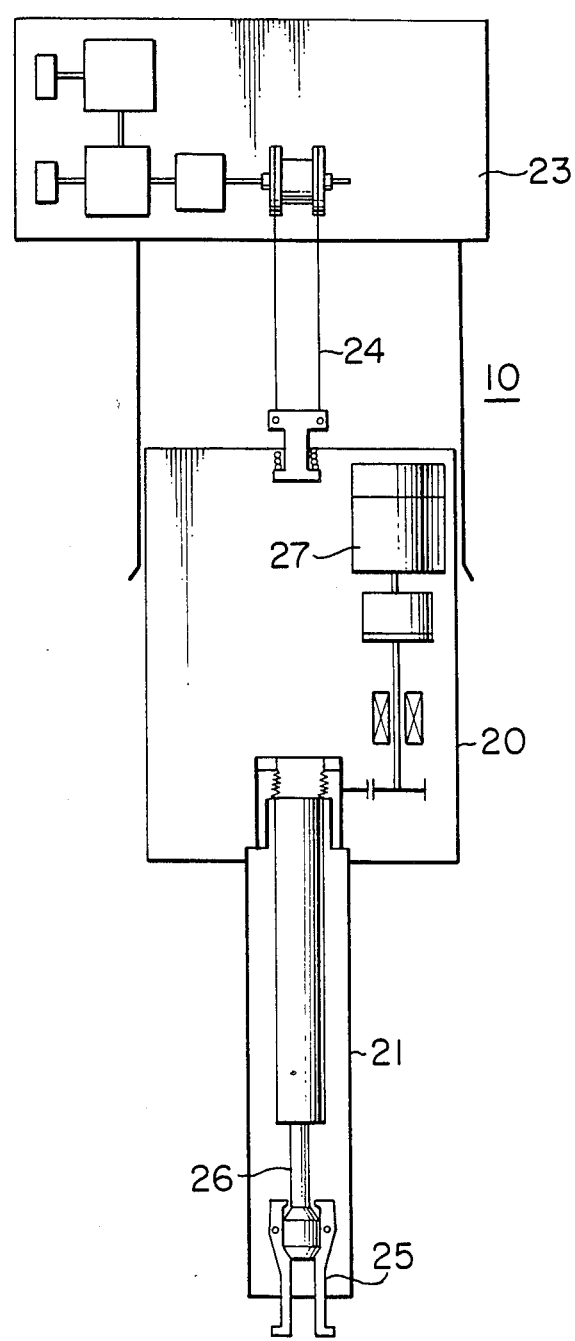
FIG. 10 is a schematic view of the structure of a conventional fuel exchanger.
Figure 11:
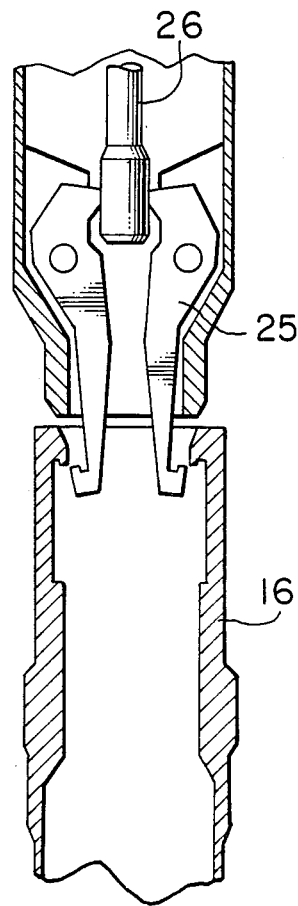
FIG. 11 is a longitudinally sectioned view of the conventional fuel exchanger in a state wherein claws thereof are being inserted into a core constituent element.
Figure 12:
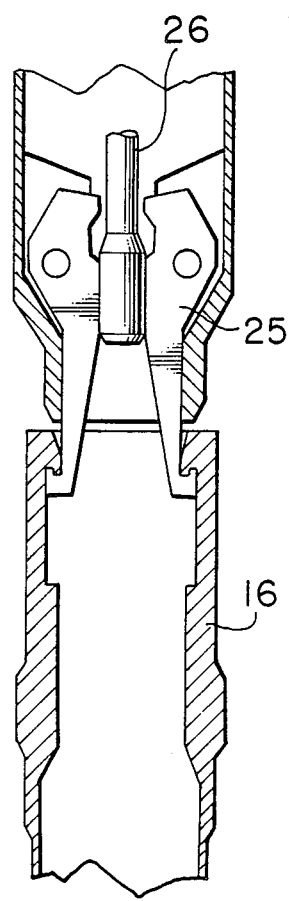
FIG. 12 is a longitudinally sectioned view of the conventional fuel exchanger in a state wherein the claws thereof are gripping a core constituent element.
Figure 13:
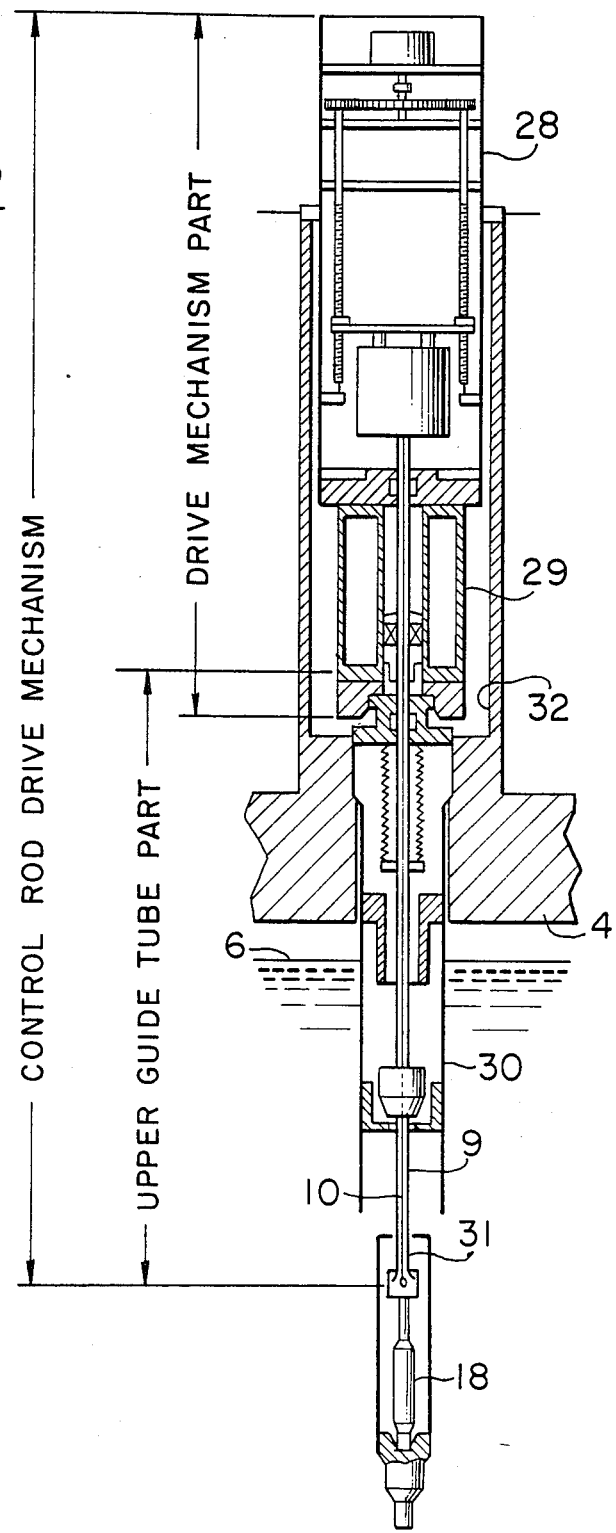
FIG. 13 is a longitudinally sectioned view of a conventional control rod drive mechanism.

The third embodiment shown in FIG. 5 is also an embodiment in which only the first elevating drive mechanism is changed, but the other parts are the same as those in the first embodiment. Therefore, only the changed part is described below.

The first motor 42 is provided on the frame 50 fixed to the frame 40, and one end of a rope 100 is fixed to the lower surface of the frame 50 by means of a rope clamp 99. An intermediate portion of the rope 100 is passed through a pulley 46 provided on the first elevating frame 54 and through a pulley 48 provided on the lower surface of the frame 50, and the other end of the rope 100 is fixed to a balance weight 101. A gear 102 rotated by the first motor 42 is engaged with a gear 103 having a shaft which is common with the pulley 48.

Therefore, when the first motor 42 is driven, each of the gears 102, 103 is rotated so as to rotate the pulley 48. The first elevating frame 54 can be thus moved upward.

Since the other parts are the same as those in the first embodiment, the third embodiment can achieve the same functional effect as the first embodiment.

In accordance with the present invention, it is possible to remove the space required for a conventional fuel exchanger and reduce the size of a reactor.

We claim as our invention:

1. In a nuclear reactor having a core composed of core constituent elements, the core constituent elements including a plurality of fuel rod assemblies and a plurality of control rod assemblies, each of the control rod assemblies having a control rod provided for vertical movement, an apparatus for handling the core constituent elements comprising:

a gripper supporting frame;

a plurality of grippers pivotally mounted within a lower portion of the gripper supporting frame for pivotal movement about respective pivot points and being equally angularly spaced from one another about an axis of the gripper supporting frame, each of the grippers being an elongated member having means forming a lower hook at a lower portion of the gripper disposed below the pivot point thereof and projecting inwardly, each of the grippers having means forming an upper hook disposed below the pivot point thereof and above the lower hook means and projecting outwardly, each of the grippers having an upper projection projecting inwardly provided above the pivot point thereof and at an upper portion of the gripper and a lower projection projecting inwardly provided below the pivot point thereof, the lower hook means being arranged for engagement with an outside of a head portion of the control rod of the control rod assemblies when the plurality of gripper are in a closed position so as to enable vertical movement of the control rod during engagement, and the upper hook means being arranged for engagement with an inside of a handling head of at least one of a fuel rod assembly and a control rod assembly of the core constituent elements when the grippers are in an open position for enabling vertical movement of the core constituent element during engagement when the grippers are in the open position;

an operational shaft extending vertically and between the plurality of grippers, the operational shaft having a small diameter portion provided at a lower end part thereof and a large diameter portion provided above the small diameter portion, the small diameter portion being engageable with the lower projections of the grippers when the operational shaft is lowered to thereby open the grippers to enable the upper hook means of the grippers to engage with the inside of the handling head and the large diameter portion being engageable with the upper projections of the grippers when the operational shaft is raised to thereby close the grippers and enable the lower hook means to engage an outside of the head portion of the control rod;

means, provided at an upper end portion of the operational shaft, for raising and lowering the operational shaft; and means, provided at an upper portion of the handling apparatus, for raising and lowering the grippers, the operational shaft and the operational shaft raising and lowering means as a whole;

whereby the apparatus for handling the core constituent elements enable rasing and lowering of control rod assemblies and fuel assemblies as well as a control rod of the control rod assemblies.

2. An apparatus according to claim 1, wherein the means for raising and lowering the operational shaft includes a first elevating drive mechanism for longitudinally raising and lowering the operational shaft, the means for raising and lowering the grippers, the operational shaft and the operational shaft raising and lowering means including an elevating frame for supporting the first elevating drive mechanism and the grippers, a second elevating drive mechanism for longitudinally raising and lowering the elevating frame, another elevating frame for supporting the second elevating drive mechanism and the elevating frame, and a third elevating drive mechanism for longitudinally driving the another elevating frame, and a further frame which supports the third elevating drive mechanism and is provided on a small rotating plug of the nuclear reactor provided above the core.

3. An apparatus according to claim 2, wherein the third elevating drive mechanism comprises a motor supported on the further frame and a ball screw which is driven by the motor and lengthened in the longitudinal direction, the ball screw being screwed into the another elevating frame.

4. An apparatus according to claim 2, wherein the third elevating drive mechanism includes a motor supported by the another frame, a first pulley supported by the another frame and rotated by the motor, a second pulley provided on the another elevating frame, a member having one part supported by the further frame and an intermediate part passed through the first and second pulleys, and another part hung-down from the first pulley, and a balance weight supported by the hung-down part of the member while being suspended.

5. An apparatus according to claim 2, wherein the third elevating drive mechanism includes racks longitudinally provided on the another frame, rotatable pinions engageable with the racks, and a motor for rotating the pinions.

* * * * *